W. L. SULLIVAN.
CHECK ISSUING MACHINE.
APPLICATION FILED MAY 10, 1918.

1,293,974.

Patented Feb. 11, 1919.
3 SHEETS—SHEET 1.

Inventor,
William L. Sullivan.
By Bakewell & Church attys

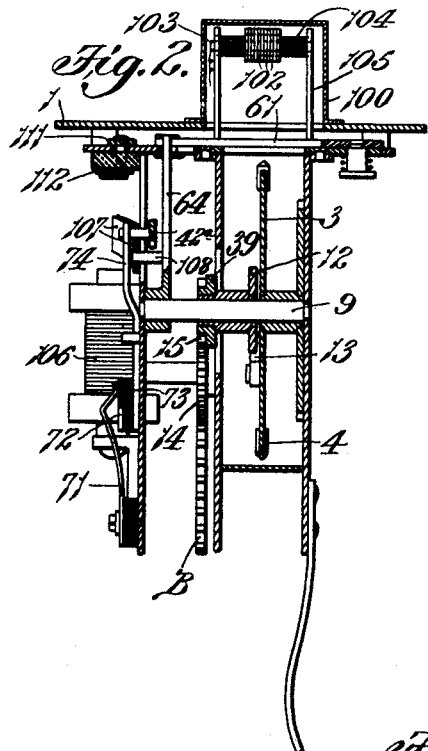

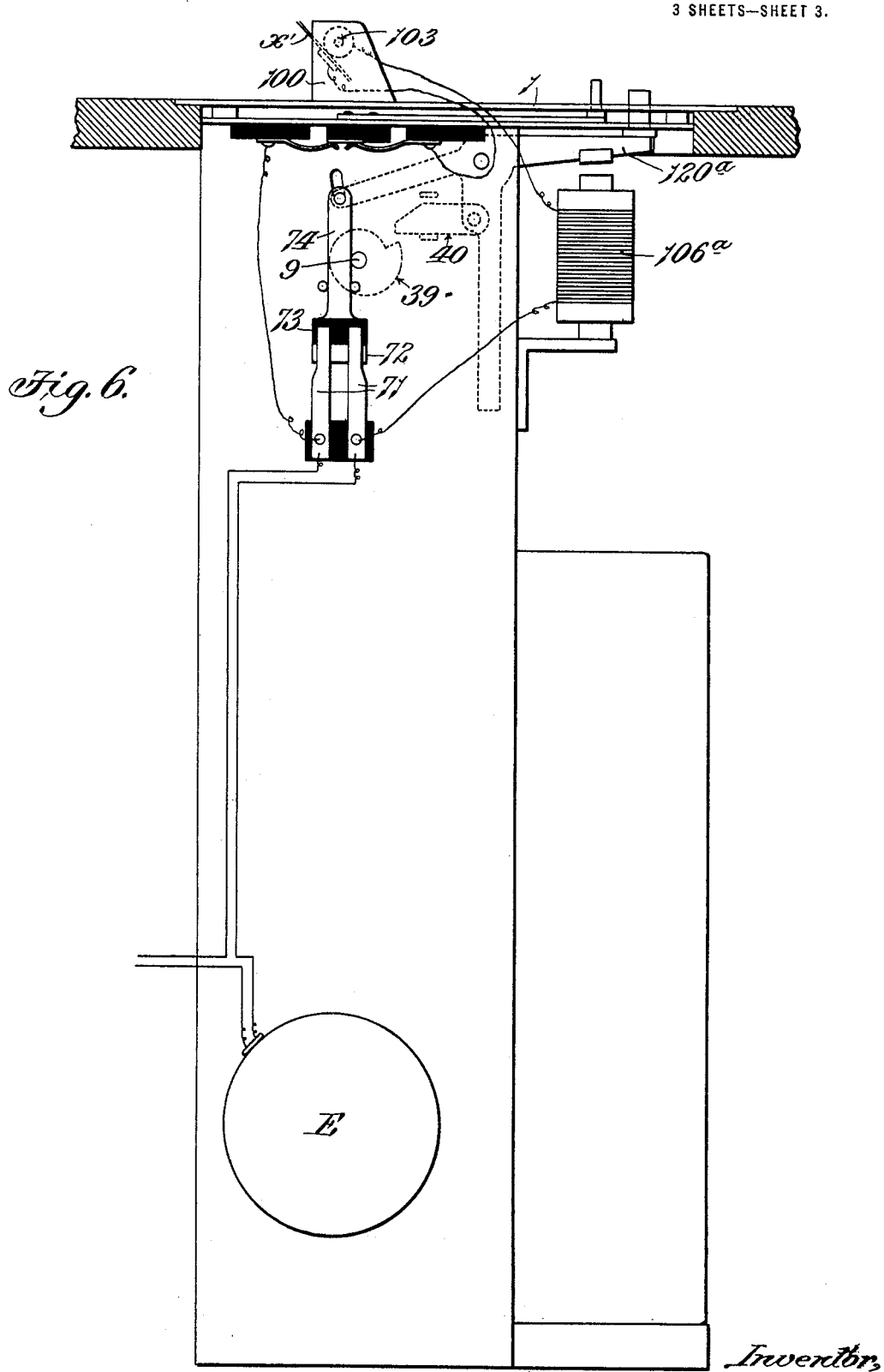

UNITED STATES PATENT OFFICE.

WILLIAM L. SULLIVAN, OF ST. LOUIS, MISSOURI.

CHECK-ISSUING MACHINE.

1,293,974.　　　　Specification of Letters Patent.　　Patented Feb. 11, 1919.

Application filed May 10, 1918. Serial No. 233,720.

*To all whom it may concern:*

Be it known that I, WILLIAM L. SULLIVAN, a citizen of the United States, residing at St. Louis, Missouri, have invented a certain new and useful Improvement in Check-Issuing Machines, of which the following is a full, clear, and exact description, such as will enable others skilled in the art to which it appertains to make and use the same.

This invention relates to machines for issuing tickets or checks.

The main object of the invention is to provide a machine that will issue tickets or checks automatically without the aid of an attendant or without necessitating the insertion of a coin in the machine.

Another object is to provide a ticket or check issuing machine which is so constructed that it can be either controlled by an attendant or put into such a condition that it will issue checks automatically when no attendant is present.

In restaurants and lunch rooms of the kind where the customers wait on themselves it is the usual practice to give each customer who enters the restaurant a check composed of a number of coupons or marked with numbers that represent fractions of a dollar, which check is subsequently punched or the coupons of same torn off by the attendants from whom the customer obtains food. Upon leaving the restaurant, the customer pays the cashier at the exit the amount indicated by the punched number of greatest value or by the unattached coupon of least value remaining on the check. None of the various types of ticket-issuing machines that are now in general use can be advantageously used in establishments of the character referred to for issuing checks or tickets of the kind mentioned, because the present ticket-issuing machines either require an attendant to control or govern the delivery of the tickets or necessitate a coin being introduced into the machine to effect the delivery of a ticket. My improved machine is so constructed that a check or ticket is always in position to be removed from the machine and the act or operation of removing one check causes another check to be automatically moved into delivering position. Accordingly, my machine is particularly well adapted for use in establishments of the kind referred to, as it overcomes the necessity of having an attendant at the entrance to hand checks to customers who enter the establishment. When an attendant is employed to hand checks to customers, as is now the usual practice, the attendant sometimes accidentally hands two checks to a customer, during rush hours, and during slack hours the attendant sometimes carelessly lays the supply of checks down on a counter while he is attending to other duties, thus making it possible for the supply of checks to be scattered about or stolen by a dishonest customer. My improved machine eliminates the possibility of the checks either becoming lost or stolen by a dishonest customer, as the supply of checks is housed in a compartment or container which is not accessible to a customer.. While my improved machine is particularly adapted for use in cafeterias and similar restaurants, owing to the fact that it dispenses with the services of an attendant at the entrance of the restaurant to deliver checks to customers, it is not limited to this particular use, but is capable of various other uses.

It is immaterial, so far as my broad idea is concerned, how the machine is constructed, so long as it will present a check or ticket in delivering position and will automatically feed another check into delivering position each time a check is removed from the machine, but I prefer to provide the machine with an electrically-operated check delivering or feeding mechanism which is so constructed that it will be rendered operative automatically by the removal from the machine of the check that was arranged in delivering position by the previous cycle of operations of said feeding mechanism. The particular construction of said feeding or delivering mechanism is immaterial and the checks can either consist of individual pieces of cardboard or other suitable material, or they can be connected together so as to form a check strip which is fed forwardly a certain distance at each cycle of operations of the machine and severed either automatically or by the operation of removing a check from the machine. I have herein illustrated my invention as an attachment to a ticket-issuing machine of the kind illustrated and described in my prior U. S. Patent No. 1,145,818, dated July 6, 1915, but as previously stated, the particular construction of the machine embodying my invention is immaterial, so far as my broad idea is concerned.

Figure 1 of the drawings is a side elevational view of a ticket-issuing machine constructed in accordance with my invention.

Fig. 2 is a vertical transverse sectional view of a portion of said machine.

Fig. 3 is a vertical longitudinal sectional view of the machine, illustrating the check strip feeding wheel.

Fig. 4 is a top plan view of the machine.

Fig. 5 is a horizontal sectional view through the upper portion of the machine, illustrating the construction of the cutters that sever the check strips into short lengths and Fig. 6 is a side elevational view, illustrating a slight modification of my invention.

Figure 1:
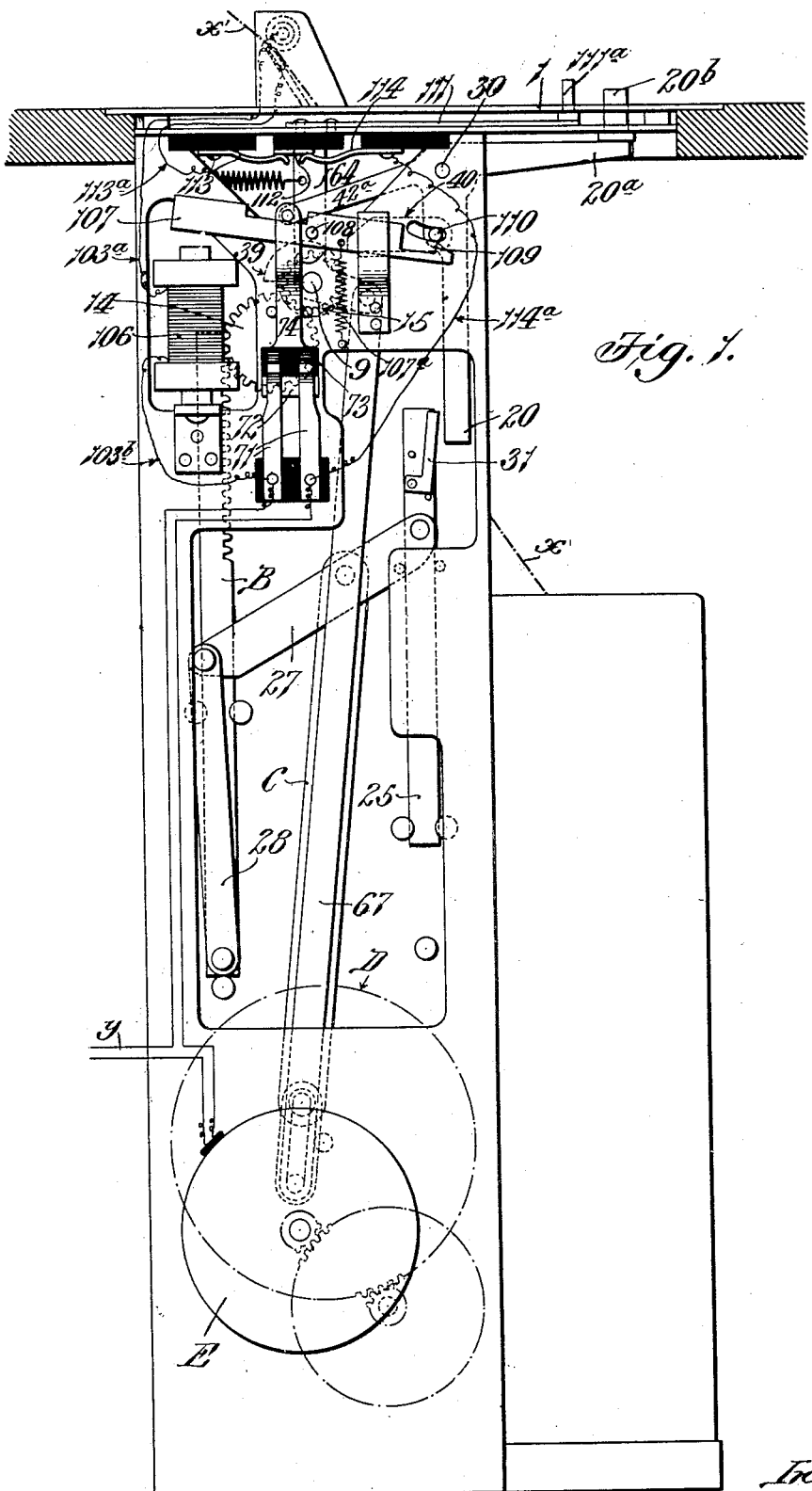

Referring to Figs. 1 to 5, inclusive, of the drawings, which illustrate one form of my invention, $x$ designates a check strip or ticket strip which is fed forwardly a certain distance at each cycle of operations of the machine and severed so as to form a check or ticket $x'$ which is held in such a position that it can be removed from the machine by a person standing in front of the machine. The mechanism for feeding the check strip forwardly and severing it into short lengths is constructed in the manner described in my U. S. patent previously referred to and comprises a feed wheel 3 rotatably mounted on a stationary shaft or stud 9 and provided with radially-projecting pins 4 that enter spaced holes in the check strip $x$, an oscillating star wheel or toothed wheel 12 that coöperates with a spring-pressed pawl 13 on the feed wheel, an actuating member B consisting of a vertically-reciprocating rack bar that meshes with an idle gear 14, which, in turn, meshes with a gear or pinion 15 on the hub of the star wheel 12, a fixed stroke driving member C operated by a rotating part such as a gear D to which the lower end of the member C is eccentrically connected, an electric motor E for operating the rotating member D, a vertically-reciprocating bar 25 arranged parallel to the actuating member or rack bar B, a lever 27 pivotally connected intermediate its ends to the driving member C and having its right hand end pivotally connected to the reciprocating bar 25 and its left hand end joined to the actuating member B by means of a link 28, and a stop 20 that coöperates with a pawl 31 on the reciprocating bar 25 to limit the upward movement of said bar 25 during the upward stroke of the driving member C, thereby causing the right hand end of the lever 27 to fulcrum on the bar 25 during the remainder of the upward stroke of the driving member C, and thus cause the actuating member B to move upwardly and impart a forward feeding stroke to the feed wheel 3. The severing mechanism for dividing the check strip into sections consists of a stationary cutter 60 arranged horizontally at one side of the check strip $x$, as shown in Fig. 3, and a co-operating movable cutter 61 arranged above the stationary cutter on the opposite side of the check strip and pivotally connected at one end to the stationary cutter. The movable cutter 61 is operated positively in both directions by means of a rock arm 64 consisting of a bell crank lever whose vertical arm is pivotally connected at its upper end to the free end of the movable cutter 61 and whose horizontal arm is connected by means of a link 67 with the motor-driven element D of the machine, said link 67 being eccentrically connected to the element D so that said link will be reciprocated upwardly and downwardly once at each cycle of operations of the machine. The stop 20, previously referred to, that limits the upward movement of the reciprocating bar 25, consists of a depending arm on a key lever 20$^a$ that is pivotally mounted on a horizontally-disposed shaft 30 arranged underneath the top plate of the machine, said key lever being provided with a finger piece 20$^b$ that projects upwardly through an opening in the top plate 1 of the machine. The key lever 20$^a$ is restored or moved positively back to its normally raised position by means of a cam 39, shown in dotted lines in Fig. 1, on the hub of the pinion 15 that coöperates with a pawl or dog 40 that is pivotally connected at its right hand end to the depending portion on the key lever, as shown more clearly in the modification of my invention illustrated in Fig. 6. During the first portion of the forward stroke of the check strip feeding mechanism the pawl 40 merely swings upwardly when the free end of same is acted upon by the cam 39. During the reverse stroke of the check strip feeding mechanism the cam 39, which is then traveling in a clockwise direction, or to the right, exerts pressure on the free end of the pawl 40 and moves said pawl to the right, thereby causing the key lever to be moved positively back to its normal position. A switch is provided for controlling the electric circuit that energizes the motor E, and means is provided for closing said switch when the key lever 20$^a$ is depressed and for thereafter automatically opening said switch so as to cut off the electric current. In the machine herein shown the switch above referred to comprises two spring contacts 71, shown in Fig. 1, arranged in the electric circuit $y$ that operates the motor E, and a movable or shiftable member 72 that establishes electrical connection between the contacts 71 when said member 72 is in a certain position. The movable element 72 of the switch is connected to a block of insulating material 73 which normally occupies such a position that the free ends of the contact fingers 71 bear upon said insulating material. The key lever 20ª is provided with an arm 42ª that is pivotally connected to a vertically-disposed bar 74 which carries the insulating block 73. Consequently, when said key lever is depressed the circuit $y$ will be closed and the motor E will start operating, and when said key lever is restored to its normally elevated position said circuit will be opened automatically. The parts of the machine above referred to are of the same construction as the corresponding parts of the machine described in my U. S. Patent No. 1,145,818, dated July 6, 1915 and operate in substantially the same manner, the only practical difference being that the machine herein illustrated is provided with a single key lever instead of a plurality of key levers, owing to the fact that my present machine is designed so that it will issue only one check or ticket at each cycle of operations of the machine.

In order that the machine will issue checks automatically without the aid of an attendant to govern or control the operation of the machine, I have provided it with means for causing the check strip feeding mechanism to be rendered operative automatically each time a check that has been previously positioned is removed from the machine. As shown in Figs. 1, 2 and 3 of the drawings, the top plate 1 of the machine is provided with a check holder arranged in proximity to the slot in said top plate through which the check strip is fed upwardly by the feed wheel 3 and comprising a housing 100 and means arranged inside of said housing for holding in delivering position the check $x'$ that was produced by severing the upper end portion of the check strip $x$. In the form of my invention herein illustrated said check holding means consists of a metal plate 101 arranged on the underside of the check $x'$ and a plurality of metal washers 102 arranged on the upper side of said check and mounted on a metal shaft 103 which is supported in bearings of insulating material 104 carried by uprights 105 that are arranged inside of the housing 100, as shown clearly in Figs. 2 and 3, the holes in the washers 102 through which the shaft 103 passes being enough larger than the diameter of the shaft to enable them to move downwardly by gravity into contact with the plate 101 when the check is withdrawn from the machine. If desired, a spring 102ª may be provided for assisting the downward movement of said washers. Said check holding means 101 and 102 constitute a switch that controls an electric circuit in which is arranged a means that causes the check strip feeding mechanism of the machine to operate each time a check is withdrawn from the housing 100. In the form of my invention shown in Figs. 1 to 5 the electrically-operated device that effects the operation of the check strip feeding mechanism each time a check $x'$ is withdrawn from the machine consists of an electro magnet which positions a member that is combined with the check strip severing mechanism and the stop 20 in such a manner that the power or pressure required to move the stop 20 into operative position is obtained from the check strip severing mechanism of the machine, the electromagnet being used merely to position a member which thereafter serves as a connection between the stop 20 and the bell-crank-shaped lever 64 of the severing mechanism. In the form of my invention shown in Fig. 6 the switch formed by the check holding devices 101 and 102 is arranged in a circuit provided with an electromagnet which of itself moves the stop 20 into operative position each time a check $x'$ is withdrawn from the housing 100.

Referring to Fig. 1 of the drawings, the reference character 106 designates an electromagnet that coöperates with a latch member 107 that is pivotally connected at 108 to the vertical arm of the bell-crank-shaped lever 64 of the check strip severing mechanism, said latch member being provided at its right hand end with a notch 109 that coöperates with a pin 110 on the depending portion or stop 20 of the key lever 20ª. The member 107 is either heavier on the right side of the pivot 108, or a light spring 107ª is provided for normally keeping the right hand end depressed and the left hand end elevated, as shown in Fig. 1. In order that the machine may be used to deliver checks automatically or at the will of the attendant, I have provided it with a switch that can be moved into position so as to cut the magnet 106 out of service. Said switch consists of a slide bar 111 arranged on the underside of the top plate of the machine and provided with a block of insulating material that carries a movable contact 112 which coöperates with two stationary contacts 113 and 114. The slide bar 111 is provided at one end with a finger piece 111ª that projects upwardly through an elongated slot in the top plate of the machine and the top plate is provided with the letter A in proximity to one end of said slot so as to indicate the direction in which said slide bar must be moved to cause the machine to deliver checks automatically. The plate 101 that forms part of the check holding means in the housing 100 on the top plate of the machine is connected by means of a wire 113ª with the stationary contact 113, and the stationary contact 114 is connected by means of a wire 114ª with one of the contacts 71 in the circuit $y$ that energizes the motor E. The metal shaft 103 that supports the washers 102, which coöperate with said plate 101, is connected by means of a wire 103ª with one end of the coil of the magnet 106, and the opposite end of the coil of said magnet is connected by means of a wire 103ᵇ with the other contact 71 in the motor circuit $y$.

When the machine is at rest a check $x'$ will project forwardly through an opening in the front side of the housing 100, thereby preventing the washers 102 from contacting with the plate 101, and consequently, causing the circuit in which the magnet 106 is arranged to remain open. As soon as said check is withdrawn from said housing the washers 102 that are mounted on the shaft 103 will move downwardly into engagement with the plate 101, thereby closing the circuit in which the magnet 106 is arranged, due to the fact that said washers are mounted on the shaft 103 which forms part of said circuit. In view of the fact that the magnet circuit is electrically connected with the contacts 71 of the motor circuit $y$, the motor E will start operating as soon as the magnet circuit is closed. The magnet 106 attracts the latch member 107 in a direction tending to move the right hand end of said latch member upwardly, and when the bell-crank-shaped lever 64 of the check strip severing mechanism reaches a certain position, the notch 109 in said latch member will snap into engagement with the pin 102 on the depending portion of the key lever 20ª. Thereafter, the latch member 107 will transmit movement from the lever 64 to the stop 20 in a direction causing said stop 20 to move into operative position, and on the succeeding upward stroke of the driving member C the feed wheel 3 will be turned forwardly so as to feed the upper end of the check strip upwardly into the housing 1 and between the plate 101 and the coöperating washers 102. The circuit in which the magnet 106 is arranged immediately opens and deënergizes said magnet, but the motor circuit $y$ remains closed, owing to the fact that said motor circuit is controlled by an independent switch consisting of the stationary contacts 71 and the movable contact 72. When the cam 39 strikes the dog 40 and positively restores the stop 20 and key lever 20ª to normal position, however, the motor circuit $y$ will open automatically, due to the fact that the movable contact of the switch in the motor circuit moves downwardly into an inoperative position when the stop 20 is restored to its inoperative position. When it is desired to cut the automatic check delivering mechanism of the machine out of service, the slide bar 111 is moved forwardly, or to the left looking at Fig. 1, so as to shift the contact 112 out of engagement with the two stationary contacts 113. Thereafter, the machine can be manually controlled by means of the key lever 20ª.

In the form of my invention shown in Fig. 6 an electromagnet 106ª is arranged in such a position that it will attract the key lever 120ª and move it downwardly whenever said magnet 106ª is energized, one end of the coil of the magnet being electrically connected to the shaft 103 of the check holding means in the housing 100 on the top plate of the machine and the other end of said coil being electrically connected to one of the contacts 71 of the motor circuit. A machine of the construction shown in Fig. 6 comprises fewer parts than a machine of the construction shown in Fig. 1 but it can only be used advantageously when direct current is available, owing to the fact that a relatively powerful electromagnet has to be used when the movement of the stop 20 into operative position is effected by means of the magnet. The machine shown in Fig. 1 can be operated successfully with a relatively weak electromagnet 106, on account of the fact that the magnet is not used to move the stop 20 into operative position, but, on the contrary, is used merely to position a member (the latch member 107), which thereafter serves as a link to transmit movement from the severing mechanism of the machine to the stop 20. If desired, the machine can be provided with a counting mechanism 130 operated by the feed wheel 3 for keeping track of the checks issued by the machine. While I prefer to use a switch in the magnet circuit consisting of a metal plate over which the checks pass and movable metal washers that drop downwardly into engagement with said plate when the check is withdrawn from the machine, it will, of course, be understood that it is immaterial, so far as my broad idea is concerned, what means is employed for closing the magnet circuit, so long as said means is of such a character that the magnet circuit will close automatically whenever a check that has been previously positioned is withdrawn from the machine. I prefer, however, to use a means of the character herein illustrated for controlling the magnet circuit, as I have found said means to be very efficient, in that it comprises a plurality of movable contacts (the washers 102), one or the other of which is always sure to drop downwardly into engagement with the plate 101, and thus close the circuit whenever the then positioned check is withdrawn from the machine.

From the foregoing it will be seen that I have devised a check or ticket-issuing machine that can be used for delivering checks or tickets without the aid of an attendant or without the necessity of inserting a coin in the machine prior to the issuance of the check. The machine is so constructed that a check is always in position to be removed and at such times all parts of the machine are at rest. The act of removing the check, however, starts the machine operating and causes another check to be fed automatically into delivering position, the machine coming to rest automatically after the cycle of operations has been completed. In the preferred form of my invention, as herein shown, the machine is so constructed that it can be used either to deliver checks automatically or to deliver checks when a controlling element is manually actuated by an attendant or operator, means being provided for cutting the automatic delivering mechanism out of service when it is desired to have the machine controlled by an attendant. A machine of the construction above described, when used in a cafeteria or restaurant of the kind where the customers wait on themselves, overcomes the necessity of employing an attendant at the entrance of the restaurant to issue tickets or checks to customers, and it keeps the supply of checks in an orderly manner and prevents them from becoming lost or stolen by a dishonest customer.

Having thus described my invention, what I claim, and desire to secure by Letters Patent, is:

1. A check or ticket-issuing machine, comprising a check strip feeding mechanism, a cutting mechanism for severing the end portion of said strip, and means whereby the act of removing the severed portion of the strip from the machine causes said strip to be fed forwardly and another section of same to be severed.

2. A check or ticket-issuing machine, comprising a check holding means, means for feeding the end portion of a check strip into operative position in said means, means for severing the end portion of said strip, and means for causing said feeding means and severing means to operate in proper sequence when the check that is in delivering position is removed from said check holding means.

3. A check or ticket-issuing machine, comprising an electrically-operated mechanism for feeding a check into delivering position, and a switch governed by the check that is in delivering position for controlling the circuit that energizes said mechanism.

4. A check or ticket-issuing machine, comprising an electrically-operated mechanism for feeding a check into delivering position, and a switch for controlling the circuit that energizes said mechanism, said switch comprising contacts arranged in such a manner that they will be held spaced apart, thus maintaining the circuit open, by the check that is in delivering position.

5. A check or ticket-issuing machine, comprising an electrically-operated mechanism for feeding a check into delivering position, and means governed by the check that is in delivering position for controlling the circuit that energizes said mechanism, said means being so constructed that the circuit will close automatically when the check that is in delivering position is removed from the machine.

6. A check or ticket-issuing machine, comprising an electrically-operated mechanism for feeding a check into delivering position, an electric circuit for energizing said mechanism, and a controlling switch in said circuit comprising a part over which the check is fed into delivering position and a means that is moved downwardly by gravity into engagement with said part when said check is removed from the machine.

7. A check or ticket-issuing machine, comprising an electrically-operated mechanism for feeding a check into delivering position, an electric circuit for energizing said mechanism, and a controlling switch in said circuit comprising a part that supports the check that is arranged in delivering position and a plurality of freely movable devices that bear upon the top side of the check and move downwardly into engagement with said part when the check is removed from the machine.

8. A check or ticket-issuing machine, comprising an electrically-operated mechanism for feeding a check into delivering position, an electric circuit for energizing said mechanism, and a controlling switch in said circuit comprising a part arranged on one side of the check that is in delivering position, and a plurality of metal washers or devices of similar form arranged on the opposite side of said check and supported by a metal shaft that is connected to said circuit.

9. An electrically-operated check or ticket-issuing machine provided with a check holding means, comprising a housing for receiving a check that is to be delivered, and an electric switch in said housing having contacts that are held spaced away from each other by the check in said housing.

10. An electrically-operated check or ticket-issuing machine provided with a check holding means, comprising a housing having an opening through which the check that is in delivering position projects, a switch in said housing having a contact arranged on one side of the check in said housing, a coöperating contact consisting of a plurality of metal washers arranged on the opposite side of said check, and a supporting shaft for said washers insulated from said housing and being of such diameter that said washers can move into engagement with said contact when the check is removed from said housing.

11. A check or ticket-issuing machine, comprising a check feeding mechanism for moving a check into delivering position, an electric motor for actuating said mechanism, a means controlled by the check that is in delivering position for causing said motor to start operating when said check is removed from the machine, and an independent means for causing said motor to cease operating after the cycle of operations of the machine has been completed.

12. A check or ticket-issuing machine, comprising a check strip feeding mechanism, a severing mechanism for said check strip, an electric motor for actuating said mechanisms, a switch controlled by the check that is in delivering position for causing said motor to start operating when said check is removed from the machine, and an independent switch actuated by a movable part of the machine for causing said motor to cease operating after the check strip has been severed.

13. A check or ticket-issuing machine, comprising a check feeding mechanism for moving a check into delivering position, means for causing said mechanism to operate automatically when the check that is in delivering position is removed from the machine, and an independent means adapted to be controlled by an attendant or operator for governing the operation of said feeding mechanism.

14. A check or ticket-issuing machine, comprising a mechanism for feeding a check strip forwardly and severing the end portion of said strip, an electric motor for actuating said mechanism, an electric magnet or similar device governed by the check that is in delivering position, and means operated by said magnet for effecting the operation of the check strip feeding mechanism when the check that is in delivering position has been removed from the machine.

15. A check or ticket-issuing machine, comprising a check strip feeding mechanism, an electrically-operated actuating member, a device for causing movement to be imparted from said actuating member to said feeding mechanism, an electromagnet governed by the check that is in delivering position, and an element controlled by said magnet for transmitting movement from the severing mechanism to said device so as to cause the feeding mechanism to start operating after the check that is in delivering position is removed from the machine.

16. A check or ticket-issuing machine, comprising a check strip feeding mechanism, an electrically-operated actuating member, a stop, which, upon being moved into a certain position, causes said feeding mechanism to be operated by said actuating member, a magnet or similar device governed by the check that is in delivering position, and an element actuated by said magnet for causing a movable part of the machine to shift said stop into operative position after the machine has started operating.

17. A check or ticket-issuing machine, comprising a check strip feeding mechanism, an electrically-operated actuating member, a stop, which, upon being moved into a certain position, causes said feeding mechanism to be operated by said actuating member, a magnet or similar device governed by the check that is in delivering position, an element actuated by said magnet for causing a movable part of the machine to shift said stop into operative position after the machine has started operating, means for restoring said stop to its inoperative position, and a mechanically-operated means for opening the circuit that causes said electrically-operated actuating member to start operating.

18. A check or ticket-issuing machine, comprising a check strip feeding mechanism, a severing mechanism, an electrically-operated actuating member, a stop, which, upon being moved into a certain position, causes said actuating member to impart movement to said feeding mechanism and said severing mechanism, an electromagnet or similar device governed by the check that is in delivering position, and a latch member operated by said magnet and combined with said severing mechanism in such a manner that it will transmit movement from said severing mechanism to said stop so as to shift said stop into operative position.

19. A check or ticket-issuing machine, comprising a check strip feeding mechanism provided with a motor-operated driving element which positively moves the various elements of the machine forwardly to cause the machine to operate and also backwardly to restore said elements to starting position, and means for causing said driving element to start operating automatically when a check that is in delivering position is removed from the machine.

20. A check or ticket-issuing machine, comprising a check strip feeding mechanism and a severing mechanism for dividing said strip into sections, a positively acting driving means that operates said mechanisms forwardly and backwardly so as to cause them to operate and then be restored to starting position at each cycle of operations of the machine, and means whereby the removal from the machine of a check that is in delivering position causes said driving means to start operating.

21. A check or ticket-issuing machine, comprising a check feeding mechanism, means adapted to be controlled by an operator for rendering said mechanism operative, an independent electrically-actuated means for causing said mechanism to operate automatically when a check that is in delivering position is removed from the machine, and means under the control of the operator for rendering said electrically-actuated means inoperative.

WILLIAM L. SULLIVAN.